Patented June 18, 1929.

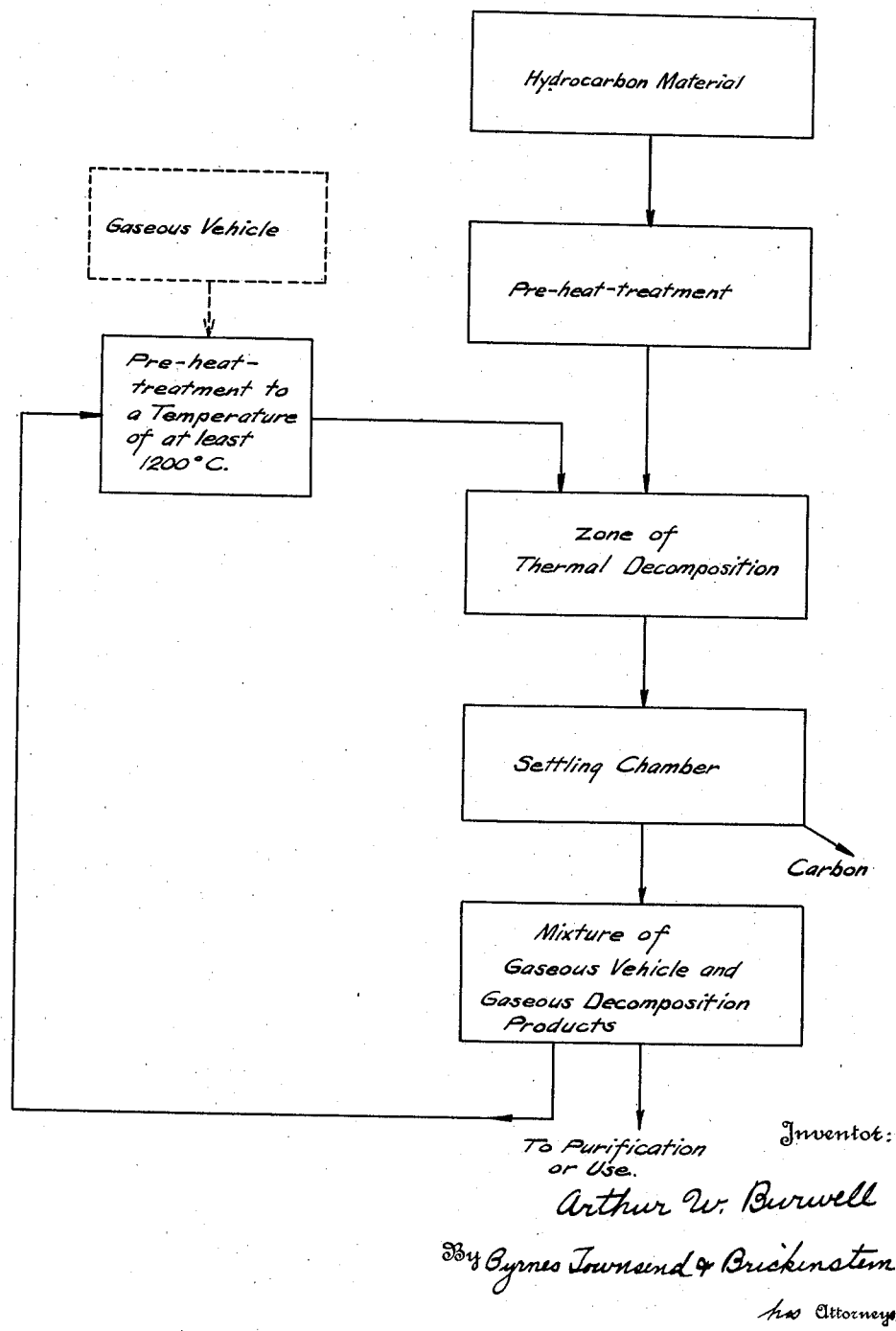

1,717,354

UNITED STATES PATENT OFFICE.

ARTHUR W. BURWELL, OF NIAGARA FALLS, NEW YORK, ASSIGNOR TO ALOX CHEMICAL CORPORATION, OF NEW YORK, N. Y., A CORPORATION OF NEW YORK.

PRODUCTION OF HYDROGEN AND CARBON BY THERMAL DECOMPOSITION OF HYDROCARBONS.

Application filed August 22, 1927. Serial No. 214,748.

This invention relates to processes for the production of hydrogen and carbon which involves the essential step of thermally decomposing hydrocarbon material; more particularly, it relates to a special procedure for effecting said essential step whereby to control the quality of carbon so produced.

One of the greatest difficulties encountered in the manufacture of carbon (i. e., carbon blacks, lamp blacks and the like) and hydrogen from hydrocarbons is in the removal of the carbon from the zone of thermal decomposition treatment under such controlled conditions as to avoid deterioration of the carbon and to obtain a carbon product having predetermined physical characteristics.

An object of the present invention is to provide a process for the production of hydrogen and carbon by the thermal decomposition of hydrocarbons, the practicing of which makes possible a material improvement in the carbon product. Another object is to provide such a process whereby the physical characteristics of the carbon product may be controlled.

I have found that the above, and other, objects may be attained by the practicing of a process involving the essential steps of bringing a stream of hydrocarbon material (preferably, hydrocarbon material preheated to a temperature just short of the thermal decomposition temperature thereof) into contact with a stream of a gas which is inert to hydrogen and to carbon and which is at a temperature sufficient to effect the thermal decomposition of the hydrocarbon material,—thus creating a zone of thermal decomposition of said material, moving the stream of decomposition products and inert gas out of the zone of thermal decomposition, and separating carbon from said last named stream. While the invention is not restricted thereto, my preferred procedure involves the additional steps of continuously diverting a major portion of the stream of inert gas and gaseous decomposition products (free from carbon), preheating said portion, with or without the addition of more of the aforesaid inert gas, to a temperature sufficient to effect the thermal decomposition of the hydrocarbon material, and effecting the thermal decomposition of further amounts of the said material in the manner above described by the use of said preheated portion. The present invention, therefore, embraces, as a preferred procedure, a cyclic process which comprises adding hydrocarbon material (preferably, preheated hydrocarbon material) to a constant amount of an inert gaseous vehicle, heated to a temperature sufficient to effect the thermal decomposition of said material, in a closed cycle of operations comprising establishing a zone of thermal decomposition of said material in said vehicle, withdrawing the resulting decomposition products comprising hydrogen and carbon from said zone in said vehicle, and separating carbon from said decomposition products and said vehicle, withdrawing from the closed cycle gaseous product in amount substantially equivalent to the amount of hydrocarbon material added to said cycle, and withdrawing with said gaseous product inert gaseous vehicle in an amount equivalent to such amounts thereof as may be added to the closed cycle.

As the inert gaseous vehicle referred to above, there may be employed hydrogen (i. e., either substantially pure hydrogen or the hydrogen product known as commercial hydrogen), nitrogen, or any other gas which can not combine with hydrogen or with carbon under the conditions of the process herein disclosed. Whatever may be the selected inert gaseous vehicle, I prefer to maintain in the said closed cycle an amount of gas largely in excess of the amount of gaseous product withdrawn from said cycle.

The particular hydrocarbon material used as the starting material may be petroleum oil or a petroleum oil fraction, or it may be a hydrocarbon-containing gas such as for example natural gas, or it may be shale oil, or a mixture of hydrocarbons derived from coal or the like, or, said starting material obviously may comprise a plurality of the hydrocarbon materials named.

While it has been stated hereinbefore that the hydrocarbon material preferably may be preheated to a temperature just short of the thermal decomposition temperature thereof, the invention embraces the conception of omitting a preheating treatment of the starting material beyond that necessary for the vaporization of the same and of correspondingly highly preheating the gaseous vehicle. In general, it may be stated that, in these cases wherein the hydrocarbon material has been preheated to a temperature just short of the thermal decomposition temperature thereof, the gaseous vehicle should be at a temperature of from about 1200° to about 1300° C. at the point where the preheated hydrocarbon material is introduced into the said closed cycle. The preheating of the gaseous vehicle may be effected in any suitable manner; for example it may be passed through a retort, of nickel or other suitable material, maintained at the required high temperature by any operable means.

As one embodiment of the process according to the present invention there will be described hereinafter a specific procedure involving the thermal decomposition of a petroleum fraction being a mixture comprising paraffin hydrocarbons and having a boiling point range of 112°–300° C. and a specific gravity of about 40° Bé., using as the gaseous vehicle for the closed cycle operations the gaseous decomposition products obtained from the thermal decomposition of said petroleum fraction. The accompanying drawing is a self-explanatory schematic representation of this specific procedure, which schematic representation is applicable generally to the process according to the present invention.

The petroleum fraction above identified is subjected to a heat treatment, in a still or retort or equivalent means, of such duration and extent as to bring the temperature of the vaporized material to a point just short of the thermal decomposition temperature thereof,—i. e., to a temperature of from about 150° to about 450° C. A stream of the vapors of said preheated hydrocarbon material is passed into contact with a closed-cycle stream of commercial hydrogen heated to a temperature of from about 1200° to about 1300° C., the volumetric amount of said preheated commercial hydrogen flowing through the thermal decomposition zone of said cycle in a given period of time, being largely in excess of the volumetric amount of gaseous decomposition products produced during said period of time in said closed cycle operations, i. e., in the ratio of about 8 or 10 to 1. A thermal decomposition zone thereby is created and/or maintained; the resulting decomposition products remaining therein only for so long a time as is required for the substantially complete decomposition of the preheated petroleum fraction before being moved out of said zone into a settling chamber or equivalent means for separating carbon therefrom. The resulting gas, comprising commercial hydrogen (i. e., hydrogen together with relatively small amounts of methane-type hydrocarbons with or without relatively small amounts of sulfur compounds, carbon oxides and nitrogen), obtained by separating carbon from the mixture of gaseous vehicle and gaseous decomposition products, is divided into two portions, the major portion being retained in the closed cycle (i. e., returned for heat treatment and use as the gaseous vehicle for the thermal decomposition of further amounts of the starting material, while the remaining portion is withdrawn for purification or use.

By varying the type of hydrocarbon material used as starting material and the ratio between the amount of the gaseous vehicle and the amount of gaseous decomposition products the quality of the carbon product, (i. e., fineness, etc.) may be varied.

As has been indicated hereinbefore the gaseous vehicle may be nitrogen. If nitrogen is so used, the relative proportion of mixed gas (comprising nitrogen and commercial hydrogen) removed from the closed-cycle operations to that retained in said closed-cycle may be increased, there being added to said closed cycle nitrogen in amount equivalent to the amount of nitrogen removed therefrom. As is obvious, the relative proportion of nitrogen to hydrogen in the gas withdrawn from the cycle may be adjusted, for instance, to give a gas mixture adaptable for use in ammonia synthesis.

I claim:

1. Process which comprises adding vaporized hydrocarbon material to a stream containing an inert gaseous vehicle, heated to a temperature sufficient to effect the thermal decomposition of said material, moving in a closed cycle of operations comprising establishing a zone of thermal decomposition of said material in said vehicle, withdrawing the resulting decomposition products consisting essentially of hydrogen and carbon from said zone in said vehicle, separating carbon from said decomposition products and said vehicle, withdrawing from the closed cycle at least a portion of the gaseous product and preheating the residual components of the stream in closed cycle to a temperature sufficient to effect thermal decomposition of vaporized hydrocarbon material.

2. Process which comprises adding vaporized hydrocarbon material to a stream of an inert gaseous vehicle, heated to a temperature sufficient to effect the thermal decomposition of said material, moving in a closed cycle of operations comprising establishing a zone of thermal decomposition of said material in said vehicle, withdrawing the resulting decomposition products consisting essentially of hydrogen and carbon from said zone in said vehicle, and separating carbon from said decomposition products and said vehicle, adding inert gaseous vehicle to said closed cycle at a point subsequent to carbon separation and prior to heat treatment of said vehicle, and withdrawing from said closed cycle at a point preceding the point of addition of inert gaseous vehicle to said cycle gas in amount substantially equivalent to the amounts of inert gaseous vehicle and of hydrocarbon material added to said closed cycle.

3. Process for the thermal decomposition of hydrocarbon material with the production of hydrogen and carbon as defined in claim 1, in which said hydrocarbon material is preheated to a temperature just short of its thermal decomposition temperature preliminarily to said addition.

In testimony whereof, I affix my signature.

ARTHUR W. BURWELL.